United States Patent [19]

Ward et al.

[11] Patent Number: 5,096,623
[45] Date of Patent: Mar. 17, 1992

[54] PROCESS AND COMPOSITION FOR PRODUCING FLAME RETARDANT REBONDED FOAM PRODUCTS

[75] Inventors: Robert W. Ward; Rogelio Tornero, both of Greensboro; Freeman J. Henderson, High Point, all of N.C.

[73] Assignee: Triad-Fabco, Inc., Greensboro, N.C.

[21] Appl. No.: 743,721

[22] Filed: Aug. 12, 1991

[51] Int. Cl.$^5$ ............................................. C09K 21/00
[52] U.S. Cl. ..................................... 252/609; 521/54; 521/57; 521/103; 521/106; 521/120; 521/125; 521/906; 521/55
[58] Field of Search ..................... 252/609; 521/54, 55, 521/57, 103, 106, 120, 125, 906

[56] References Cited

U.S. PATENT DOCUMENTS

| | | | |
|---|---|---|---|
| 4,089,912 | 5/1978 | Levek et al. | 521/112 |
| 4,137,254 | 1/1979 | Larkin | 558/329 |
| 4,142,996 | 3/1979 | Wong et al. | 264/13 |
| 4,182,799 | 1/1980 | Rodish | 521/98 |
| 4,385,131 | 5/1983 | Fracalossi et al. | 521/128 |
| 4,438,220 | 3/1984 | Fracalossi et al. | 521/137 |
| 4,764,539 | 8/1988 | Ladang | 521/179 |
| 4,783,221 | 11/1988 | Grove | 106/18.2 |

Primary Examiner—Morton Foelak

[57] ABSTRACT

A flame retardant composition and process which is particular useful for rebonded foam products. The composition of the present invention includes a solid component of magnesium sulfate, boric acid, decabromodiphenylethylene oxide (DECA) and antimony trioxide and a liquid component of halogenated phosphorous. The present invention is based upon the discovery of the synergism between boric acid and DECA. The process, according to the present invention, includes the steps of forming a dispersion of the solid portion of the flame retardant composition along with a small amount of water based adhesive to a mass of foam chips. The treated chips are then dried to permit handling and storage. The dried foam chips subsequently are mixed with a conventional urethane prepolymer binder and the liquid halogenated phosphorous flame retardant compound. After mixing the foam mass is transferred to molds and steamed to allow the binder to cure. Rebonded foam manufactured by this process displays excellent physical properties while, at the same time, exhibits a Flame Spread Index $I_s$ value of less than about 25.

4 Claims, No Drawings

PROCESS AND COMPOSITION FOR PRODUCING FLAME RETARDANT REBONDED FOAM PRODUCTS

BACKGROUND OF THE INVENTION (1) Field of the Invention

The present invention relates generally to rebonded foam materials and, more particularly, to a process and composition for producing a rebonded foam product having improved flame retardancy properties.

(2) Description of the Prior Art

Polyurethane foam is widely used as cushioning or padding materials. However, because of its cost, there is a significant market for rebonded waste foam chips. Because of the eclectic appearance of rebonded foam, it is usually used where it is not readily seen, for example, as carpet pads and upholstery. Conventionally, rebonded foam is made by shredding and grinding waste polyurethane foam to form polyurethane foam particles, mixing the polyurethane foam particles with a binder, and then curing the binder by one of a number of means, including steam. Accordingly, rebonded foam generally has a relatively high and non-uniform density. Over the years there have been various modifications of the rebonding foam process. Examples of such improvements are described in U.S. Pat. Nos. 3,790,422, 3,894,973, and 4,014,826.

Because of the danger of fire, foam products are often treated with a flame retardant. However, when fabricating rebonded foam, it has generally been possible to incorporate only relatively low amounts of flame retardant materials into the foam to render the resultant foam flame retardant. When large amounts are flame retardant materials are added, the resulting foam generally has poor physical characteristics.

Various means have been tried to improve the flame retardancy of foam and rebonded foam products. For example, U.S. Pat. No. 4,385,131 is directed to the inhibition of smoldering. The resistance to smoldering is achieved by mixing a smoldering agent, e.g., urea, melamine, or a combination thereof, in quantities of at least 40 parts by weight of the smoldering agent to 100 parts of foam chips. A binder is then added to hold the chips and agent together. The mixture is then compressed and cured.

In addition, U.S. Pat. No. 4,438,220 is directed to use of large amounts of solid flame retardant to prevent combustion. This patent is sometimes referred as the "foam-in-foam" patent or the "foam filled foam" patent. Under this approach, the rebonded foam is made by shredding or grinding foam, mixing a solid flame retardant material, and incorporating the mixture of shredded foam and flame retardant material to a new foam formed by polyol and polyisocyanate with enough added water to cause foaming.

In addition to the above patents, various systems have developed for imparting fire retardancy to other polymeric materials. For example, U.S. Pat. No. 4,764,539, issued to Ledane, discloses a combination of materials which imparts superior fire retardant properties to organic polymers. The composition is made up of an organophosphate plasticizer, aluminum hydroxide or aluminum hydrate, amino trioxide, a borate, a bromated hydrocarbon, and a chlorinated paraffin.

U.S. Pat. No. 4,182,799, issued to Rodish, discloses a flame retarding additive for foam polystyrene which is composed of 40-50 weight percent halogenated hydrocarbon, 9-15 weight percent of antimony oxide, 14-22 weight percent of zinc borate, and 16-28 weight percent hydrated alumina.

Finally, U.S. Pat. No. 4,089,912, issued to Levea, discloses a polymer system which incorporates a flame retarding system made up of antimony trioxide and a bromine containing organic compound. Levea also teaches a flame retardant such as zinc borate or the like to be used in place of antimony trioxide either in whole or in part.

Thus, attempts to impart flame retardancy to polymeric materials such as rebonded polyurethane foam have generally been limited to incorporating various percentages of brominated phosphorous combinations in liquid form and by introducing solid compounds such as melamine, antimony oxide, hydrated alumina and others.

Furthermore, with the advent of more stringent fire retardancy requirements, such as the ASTM-E-162 Radiant Panel Test, achievement of low Flame Spread Index (I) values requires the inclusion of a high percentage of solids to the foam mass. However, it has been generally necessary to use an organic vehicle such as methylene chloride to impregnate the foam chips with the flame retardant agents. However, methylene chloride requires special handling both to prevent contact with skin and to provide adequate ventilation. In instances where water has been used as a vehicle for impregnating the foam chips with flame retardant agents, it has been limited to water soluble fire retardants such as urea.

These systems have significant drawbacks. As discussed above, the use of chlorinated solvents in industrial processes is being severely limited due to potential safety and environmental hazards. In addition, rebonded foam composites made with water soluble agents are not commercially acceptable due to the field migration of the agents, loss of the flame retardancy properties, and contamination of the surfaces on which the foam comes in direct contact due to dusting. Further, rebonded foam composites manufactured with a sufficiently high loading of solid fire retardant agents generally do not produce acceptable physical properties due to particle interference with the adhesive used to rebond the foam chips. In addition, the solid flame retardant agents generally fail to penetrate the cell structure of the foam chip, thereby causing the foam mass to often exhibit a flash phenomena which when exposed to a heat source for an extended period of time.

Thus, it has become desirable to develop a flame retardant system for rebonded foam which eliminates the need for dangerous chlorinated solvents and undesirable hydrated alumina while, at the same time, producing a rebonded foam material of commercially acceptable physical properties and low Flame Spread Index values.

SUMMARY OF THE INVENTION

The present invention solves the aforementioned problems with prior art by providing a flame retardant composition which is particularly useful for rebonded foam products. The composition of the present invention includes a solid component of magnesium sulfate, boric acid, decabromodiphenylethrlene oxide (DECA) and antimony trioxide and a liquid component of halogenated phosphorous (H/Ph). The present invention is based on the discovery of the synergism between boric acid and DECA.

In the preferred embodiment, the solid portion of the flame retardant composition includes about 72 weight percent of magnesium sulfate, 13 weight percent of DECA, 6 weight percent of antimony oxide, and 9 weight percent of boric acid.

The process, according to the present invention, includes the steps of forming a dispersion of the solid portion of the flame retardant composition along with a small amount of a water based adhesive to increase the adhesion of the dispersion to a mass of foam chips. The treated chips are then dried to permit handling and storage. Eighty weight percent of the dried foam chips subsequently are mixed with about 11 weight percent of a conventional urethane prepolymer binder and about 9 weight percent of the liquid halogenated phosphorous flame retardant compound. After mixing the foam mass is transferred to molds and steamed to allow the binder to cure. Rebonded foam manufactured with this process exhibits excellent physical properties while, at the same time, exhibit a Flame Spread Index value I of less than about 25.

Accordingly, one aspect of the present invention is to provide an improved solid flame retarding additive for polyurethane foam including: decabromodiphenylethylene oxide; percent antimony oxide; boric acid; and magnesium Another aspect of the present invention is to provide an improved solid flame retarding composition for polyurethane foam including: a solid component including decabromodiphenylethylene oxide, antimony oxide, boric acid, and magnesium, sulfate; and a liquid component including halogenated phosphorus.

Another aspect of the present invention is to provide a water-based process for producing a rebonded polyurethane foam having improved flame retardany including the steps of: (a) mixing foam chips, a solid flame retardant, and a water based adhesive with water to form a first foam mass; (b) drying the first foam mass; (c) mixing the dried foam mass, a water/steam activated binder and a liquid flame retardant to form a second foam mass; and (d) curing the second foam mass.

Still another aspect of the present invention is to provide a rebonded polyurethane foam that exhibits a Flame Spread Index $I_s$ value of less than about 25 when tested according to ASTM E-162.

These and other aspects of the present invention will become apparent to the those skilled in the art after reading the following description of the preferred embodiments.

DESCRIPTION OF THE PREFERRED EMBODIMENTS

In the following description, like references characters designate like or corresponding parts throughout the several views. Also in the following description, it is to be understood that such terms as "forward", "rearward", "left", "right", "upwardly", "donwardly", and the like are words of convenience and are not to be construed as limiting terms.

In the preferred embodiment, according to the present invention, a water dispersion -solution is first prepared of the solid portion of the flame retardant composition. Preferably, the solid fire retardant composition includes 71.9 weight percent magnesium sulfate, 13.0 weight percent antimony oxide, 8.6 weight percent boric acid and 6.5 percent decabromodiphenylethylene oxide (DECA). A preferred source of the DECA and antimony oxide is a 67.5% solids dispersion having 45 weight percent DECA and 22.5 weight percent antimony oxide hereinafter referred to as DECA/Sb.

The solid portion of the flame retardant composition, is mixed with a small percentage of a water based adhesive such as ethylene vinyl chloride. The flame retardant solids and adhesive are thoroughly mixed with water and foam chips to form a treated mass. Preferably, the mass includes 25 weight percent solid flame retardants, 32.4 weight percent foam chips, 40.5 weight percent water and 2.1 weight percent water based adhesive.

After mixing the treated foam chips which have been impregnated with the dispersion of solid flame retardants are squeezed lightly by means of rollers or other suitable means to help the solid flame retardants to penetrate into the cell structure of the foam chips. The foam mass is then dried by conventional means to allow handling and storage. While there is some loss of the solid flame retardant agents due to the squeezing process, this step is important to accomplish the penetration of the solid fire retardant agents into the foam mass.

After drying, the treated foam mass is transferred back to a mixing vessel where it is mixed with a conventional binder and a halogenated phosphorous flame retardant compound. In the preferred embodiment, the halogenated phosphorous compound, hereinafter referred to as H/Ph contains about 35-37 weight percent bromine, 8-9.5 weight percent chlorine and 6-8 weight percent phosphorous. Preferably, the final composition includes 80 weight percent treated foam chips, 11 weight of the steam-curable binder and 9 weight percent of the halogenated phosphorous compound.

The steam actuated binder is prepared by mixing 3,000 MW triol polyether with toluene diisocyante in a stoichiometric proportion to yield at least 10% NCO groups. After mixing the foam mass, binder and halogenated phosphorous compound, the foam is transferred to molds and steamed to allow the binder to cure. The rebonded foam product is then allowed to dry.

Preferably, the final product includes about 49.8 weight percent solid and halogenated phosphorous flame retardants. Preferably, the final flame retardant composition is magnesium sulfate 55.9 weight percent, boric acid 6.7 weight percent, antimony oxide 10.1 weight percent, DECA 5 weight percent and the balance halogenated phosphorous compound. Rebonded foam manufactured by this process exhibits excellent physical properties and has a Flame Spread Index $I_s$ of less than 25 when tested according to ASTM E-162.

A number of other solid flame retardants could be utilized in the water-based process of the present invention. For example, zinc borate and sodium borate could be used to replace a portion of the magnesium sulfate, however, these compositions do not yield Flame Spread Index values as good. Alumina hydrate is also an effective solid flame retardant but it significantly reduces the strength of the finished product. Also, a balance must exist in the proportions of DECA and the halogenated phosphorous compound since DECA appears to be more effective in reducing heat evolution and smoldering while the halogenated phosphorous compound is more effective against flame spread.

An understanding of the relationship and synergism between the flame retardants can best be achieved by a review of the Standard Test Method for the Surface Flammability of Materials Using a Radiant Heat Source set forth in ASTM E-162. According to this test procedure, the Flame Spread Index I of a test specimen is defined as the product of the Flame Spread Factor $F_s$ and the Heat Evolution Factor Q.

As will be seen in the examples, DECA and antimony oxide are more effective on reducing the Heat Evolution Factor Q than the halogenated phosphorous compound. On the other hand, the halogenated phosphorous compound is more effective than DECA and antimony oxide on the Flame Spread Factor $F_s$. Finally, magnesium sulfate yields better Flame Spread Index values than either alumina trihydrate or sodium borate alone. This is apparently because, while sodium borate produces slightly lower Heat Evolution Factor values, magnesium sulfate has significantly lower Flame Spread Factor values, thereby offsetting the Heat Evolution Factor advantage of the sodium borate.

The process and product according to the present invention will become more apparent when reviewing the following detailed examples.

EXAMPLES 1, 2 AND 3

400 gram samples of rebonded foam were prepared according to steps of the present invention. Each of the samples included 50 weight percent foam chips, 15 weight percent binder, 5 weight percent DECA/Sb, and 5 weight percent boric acid. The remaining 20 weight percent of each example was one of either sodium borate, magnesium sulfate or alumina trihydrate for each of examples 1, 2 and 3, respectively. After drying, the foam mass was steamed to allow the binder to cure. The rebonded foam product was then allowed to dry. After drying, samples were prepared and tested according to ASTM E-162. Typical results are shown in Table 1.

TABLE 1

| | Results of Solid Additives | | | |
|---|---|---|---|---|
| No. | Additive | $I_s$ | $F_s$ | Q |
| 1 | Sodium Borate | 192 | 20.8 | 9.2 |
| 2 | Magnesium sulfate | 113 | 11.6 | 9.8 |
| 3 | Alumina trihydrate | 181 | 17.9 | 10.1 |

EXAMPLES 4, 5 AND 6

Additional 400 gram samples of foam were prepared having 50 weight percent foam chips, 15 weight percent binder, 15 weight percent DECA/Sb and the balance 20 weight percent of either sodium borate, magnesium sulfate or alumina trihydrate. These samples did not include any H/Ph or boric acid. Typical results are shown in Table 2.

TABLE 2

| | Comparative Results Without Halogenated Phosphorous | | | |
|---|---|---|---|---|
| No. | Additive | $I_s$ | $F_s$ | Q |
| 4 | Sodium Borate | 155 | 24.5 | 6.34 |
| 5 | Magnesium sulfate | 148 | 14.9 | 9.9 |
| 6 | Alumina trihydrate | 268 | 27.0 | 9.9 |

EXAMPLES 7-8

400 gram batches of foam product were prepared according to the steps of the present invention. The composition included 40 weight percent foam chips, 15 weight percent binder, and 15 weight percent DECA/Sb. The remainder of the composition included 30 percent sodium borate and 30 percent magnesium sulfate for examples 7 and 8 respectively. Results are shown in Table 3.

TABLE 3

| | Comparative Results Without Halogenated Phosphorous | | | |
|---|---|---|---|---|
| No. | Additive | $I_s$ | $F_s$ | Q |
| 7 | Sodium Borate | 155 | 27.3 | 5.6 |
| 8 | Magnesium sulfate | 108 | 17.5 | 6.2 |

As can be seen from the above examples, changes in the composition of the solid flame retardant have significant effects either on the value of $F_s$ and/or the value of Q, thereby affecting the value of $I_s$ which is the product thereof. As seen in examples 1, 4 and 7, the compositions containing between 20–30 weight percent sodium borate have the lowest Q values. Both the sodium borate and the magnesium sulfate examples performed equivalently or better than examples 3 and 6 containing alumina trihydrate. However, as seen in examples 2, 5 and 8, the samples containing between 20–30 weight percent magnesium sulfate have significantly better $F_s$ values then either sodium borate or alumina trihydrate. Thus, while better Q values can be obtained by the use of sodium borate, there is a significant improvement in the calculated $I_s$ value when magnesium sulfate is used instead. Moreover, a comparison between examples 2 and 5 indicates that the improvement due to magnesium sulfate can further be increased by a including at least one of H/Ph or boric acid. The importance of this observation will be better understood by later discussion of examples 10–13 along with Table 5.

EXAMPLES 4 AND 9

400 gram samples of the foam composition were prepared having 50 weight percent foam chips, 15 weight percent binder, and 20 weight percent sodium borate. The remainder of the composition was either 15 weight percent DECA/Sb (DECA and antimony oxide) or 15 weight percent H/Ph (halogenated phosphorous) for examples 4 and 9 respectively. Results are shown in Table 4.

TABLE 4

| | Comparative Results Between DECA/Sb and H/Ph | | | |
|---|---|---|---|---|
| No. | Additive | $I_s$ | $F_s$ | Q |
| 4 | DECA/Sb | 155 | 27.3 | 5.6 |
| 9 | H/Ph | 108 | 17.5 | 6.2 |

As can be seen from a comparison of examples 4 and 9, once again there is a trade-off between variations in the composition of the flame retardants. DECA/Sb produces a somewhat better result of the Q value. However, H/Ph is significantly more effective than DECA/Sb on $F_s$. The above results, when read with examples 2, 5 and 8, indicate that magnesium sulfate and DECA/Sb is the most effective flame retardant composition and, in addition, small amounts of H/Ph and boric acid could improve these results further. Accordingly, the following tests were conducted.

EXAMPLES 10-13

Additional 400 gram samples of the foam composition were prepared. The weight percent of binder was kept at 10 weight percent, however, the weight percent of the foam was reduced from 50 to 45 weight percent. The balance of each example was made up of the solid and liquid flame retardant agents. In these tests, the overall amounts of antimony oxide, H/Ph and magnesium sulfate were kept relatively constant while the amounts of DECA and boric acid were varied. The results are shown in Table 5.

TABLE 5

Comparative Results
With 10 Wt. % Halogenated Phosphorous

| No. | DECA | $Sb_2O_3$ | H/Ph | $H_3BO_3$ | $MgSO_4$ | $I_s$ | $F_s$ | Q |
|---|---|---|---|---|---|---|---|---|
| 10 | — | 3.0 | 10 | 3 | 25 | 61 | 8.2 | 7.5 |
| 11 | — | 3.0 | 10 | — | 25 | 33 | 3.1 | 10.6 |
| 12 | 4.5 | 2.2 | 10 | 3 | 25 | 21 | 3.7 | 5.9 |
| 13 | 4.5 | 2.2 | 10 | — | 25 | 33 | 5.5 | 6.1 |

As can be seen, a comparison of examples 11 and 13 indicates that the addition of DECA. dramatically decreases the Q value. However, this is at the expense of the $F_s$ value thereby not resulting in a change to the calculated value of $I_s$. Moreover, a comparison of examples 10 and 11 indicates that the addition of boric acid also decreases the Q value, however, this also results in an increase in the $F_s$ value. Therefore, it was unexpected in example 12 that the addition of both boric acid and DECA decreased the Q value while, at the same time, did not significantly increase the $F_s$ value even though when DECA and boric acid were added individually, such as in examples 10 and 13, the $F_s$ value was increased.

As a result of this unexpected synergism between boric acid and DECA, the composition shown in example 12 has a Flame Spread Index $I_s$ value of only about 21 when tested according to ASTM E-162. A comparison of example 12 with example 2 shows the significant improvement shown by example 12 is accomplished with relatively small additions of DECA, antimony trioxide and H/Ph over that shown for example 2. However, these small additions produced a 6 fold reduction in the Flame Spread Index $I_s$.

Thus, the present invention provides a process and flame retardant composition by which methyl chloride solvents can be eliminated while, at the same time, a flame spread index value $I_s$ of less than 25 can be achieved.

Certain modifications and improvements will occur to those skilled in the art upon reading of the foregoing description. It should be understood that all such modifications and improvements have been deleted herein for the sake of conciseness and readability but are properly within the scope of the following claims.

We claim:

1. A solid flame retarding additive for polyurethane foam comprising:
    (a) decabromodiphenylethylene oxide;
    (b) antimony oxide;
    (c) boric acid; and
    (d) magnesium sulfate.

2. A solid flame retarding additive for polyurethane foam comprising:
    (a) about 8–13 weight percent decabromodiphenylethylene oxide;
    (b) about 4–7 weight percent antimony oxide;
    (c) about 18–8 weight percent boric acid; and
    (d) the balance of about 70–72 weight percent magnesium sulfate.

3. A flame retarding composition for polyurethane foam comprising:
    (a) a solid component including decabromodiphenylethylene oxide, antimony oxide, boric acid, and magnesium sulfate; and
    (b) a liquid component including halogenated phosphorus.

4. A flame retarding composition for polyurethane foam comprising:
    (a) a solid component including about 7–10 weight percent decabromodiphenylethylene oxide, about 3–5 weight percent antimony oxide, about 15–7 weight percent boric acid, and about 60–56 weight percent magnesium sulfate; and
    (b) a liquid component including about 15–22 weight percent halogenated phosphorus.

* * * * *